United States Patent
Hulings et al.

(10) Patent No.: US 6,320,153 B1
(45) Date of Patent: Nov. 20, 2001

(54) PLASMA CUTTING TABLE

(75) Inventors: James E. Hulings, Zelienople; Robert H. Lang, Sewickley, both of PA (US)

(73) Assignee: Billco Manufacturing, Inc., Zelienople, PA (US)

( * ) Notice: Subject to any disclaimer, the term of this patent is extended or adjusted under 35 U.S.C. 154(b) by 0 days.

(21) Appl. No.: 09/678,713

(22) Filed: Oct. 4, 2000

Related U.S. Application Data

(60) Provisional application No. 60/157,629, filed on Oct. 4, 1999.

(51) Int. Cl.[7] .................................................. H05B 10/00
(52) U.S. Cl. .............................. 219/121.39; 219/121.58; 219/121.48; 266/65
(58) Field of Search ................... 219/121.58, 121.39, 219/121.44, 121.48, 121.54, 75; 266/65, 67

(56) References Cited

U.S. PATENT DOCUMENTS

| | | | |
|---|---|---|---|
| 4,063,059 | * 12/1977 | Brolund et al. | 219/68 |
| 5,034,592 | * 7/1991 | Chun | 219/121.84 |
| 6,222,155 | * 4/2001 | Blackmon et al. | 219/121.39 |

* cited by examiner

Primary Examiner—Mark Paschall
(74) Attorney, Agent, or Firm—Webb Ziesenheim Logsdon Orkin & Hanson, P.C.

(57) ABSTRACT

A plasma cutting table includes an open frame table, a movable bridge extending across the table and a gas evacuation system. A pair of opposed plenums are positioned adjacent the table on opposite sides of the table extending along the general length of the table with each plenum forming a channel. A hopper extends across an underside of the table and is attached to the bridge to be movable relative to the table with the bridge. A pair of conduits extend from the hopper to each channel, respectively, wherein each conduit is slidably positioned in the channel formed by the respective plenum. A flexible sealing member is attached to an upper side of each plenum forming a seal between the conduit and the plenum. The flexible sealing member includes a pair of strips of flexible material extending the length of the plenum on opposed sides of the plenum, wherein the conduit is received between the pair of strips of flexible material. A vacuum pump is connected to the pair of plenums through a pair of chambers each including a plurality of baffles. The hopper, conduits, plenums, baffled chambers and vacuum pump form the gas evacuation system for the plasma cutting table.

20 Claims, 7 Drawing Sheets

PLASMA CUTTING TABLE

This application claims the benefit of U.S. Provisional Patent Application Ser. No. 60/157,629 filed on Oct. 4, 1999.

BACKGROUND OF THE INVENTION

1. Field of the Invention

The present invention relates to metal cutting, and more particularly, to high-energy thermal melting or plasma cutting devices that cut patterns in metal.

2. Brief Description of the Prior Art

Metal workpieces cart be thermally cut by a plasma cutting torch on a plasma cutting table. The workpiece is first placed on an X-Y coordinate table, with X representing a longitudinal distance of the table and Y representing a lateral distance of the table. The table is typically fashioned as a hollow grid, such as a mesh or honeycomb design. Specifically, the grid is a plurality of solid metal bars or beams forming geometrically-shaped orifices between these members. A plasma cutting torch is then positioned adjacent a top surface of the workpiece, directly opposite a portion to be cut. Plasma cutting torches ionize a column of gas with an electric arc, producing a high velocity, high temperature plasma stream. When a plasma stream strikes the workpiece, the heat instantly melts a desired portion of the workpiece away while the high-velocity stream blows the molten metal through the orifices in the table. In one prior art table, the molten metal, commonly referred to as slag, is directed by a hopper into a slag cart positioned adjacent a second surface of the table. Such an arrangement is generally disclosed in U.S. Pat. No. 4,063,059 to Brolund et al.

In addition to the slag, the ionized gas and molten metal create gaseous vapors which must be evacuated. To solve the problem of evacuating the gaseous vapors, some prior art devices have vacuum hoses positioned adjacent either the plasma torch or in a slag cart. The vacuum hoses are connected to vacuum pumps. Spark boxes, positioned between the vacuum hoses and vacuum pumps, help prevent the filtration of hot slag and gases into the vacuum pumps.

When cutting a workpiece, either the workpiece can be moved while the plasma cutting torch stays fixed, or the plasma cutting torch and hopper can move while the workpiece stays fixed. Since workpieces can be very heavy, moving the plasma cutter torch and hopper is a preferred method. However, because the plasma torch must be able to reach every point on a surface of a workpiece, the accompanying vacuum hoses must also be long enough to reach any point on the table. For example, if the plasma torch moves two feet in an X direction along the table, at least two additional feet of vacuum hose is needed. Moreover, such a table must be divided into zones, with electric or mechanical dampers in each zone. The long hose lengths are unwieldy and potentially unsafe. The hoses and dampers increase the maintenance cost of the plasma cutting torch table. Therefore, there exists a need for a plasma cutting torch table which eliminates unwieldy vacuum hoses and electronic and mechanical dampers.

SUMMARY OF THE INVENTION

The present invention includes a plasma cutting torch table having a table, a movable bridge positioned across a top surface of the table, a movable plasma cutting torch movably positioned on the bridge, and at least one plenum positioned adjacent the table. Each plenum forms a top surface channel. A hopper is positioned adjacent a second surface of the table and a conduit extends from the hopper and is slidably positioned within the channel of a corresponding plenum. A flexible material is adjacent the top surface of each plenum, wherein the flexible material forms a flexible seal between the plenum and the hopper conduit. This configuration eliminates the need for bulky vacuum hoses and eliminates the need for zoning the table with electrical or mechanical dampers. Moreover, the present invention does not require the use of venturies adjacent the plasma cutting torch or expensive hopper coatings.

It is therefore an object of the present invention to provide a plasma cutting table that is more efficient and less cumbersome to operate.

These and other advantages of the present invention will be clarified in the Detailed Description of the Preferred Embodiment taken together with the attached drawings in which like reference numerals represent like elements throughout.

DETAILED DESCRIPTION OF THE PREFERRED EMBODIMENT

Figure 1:
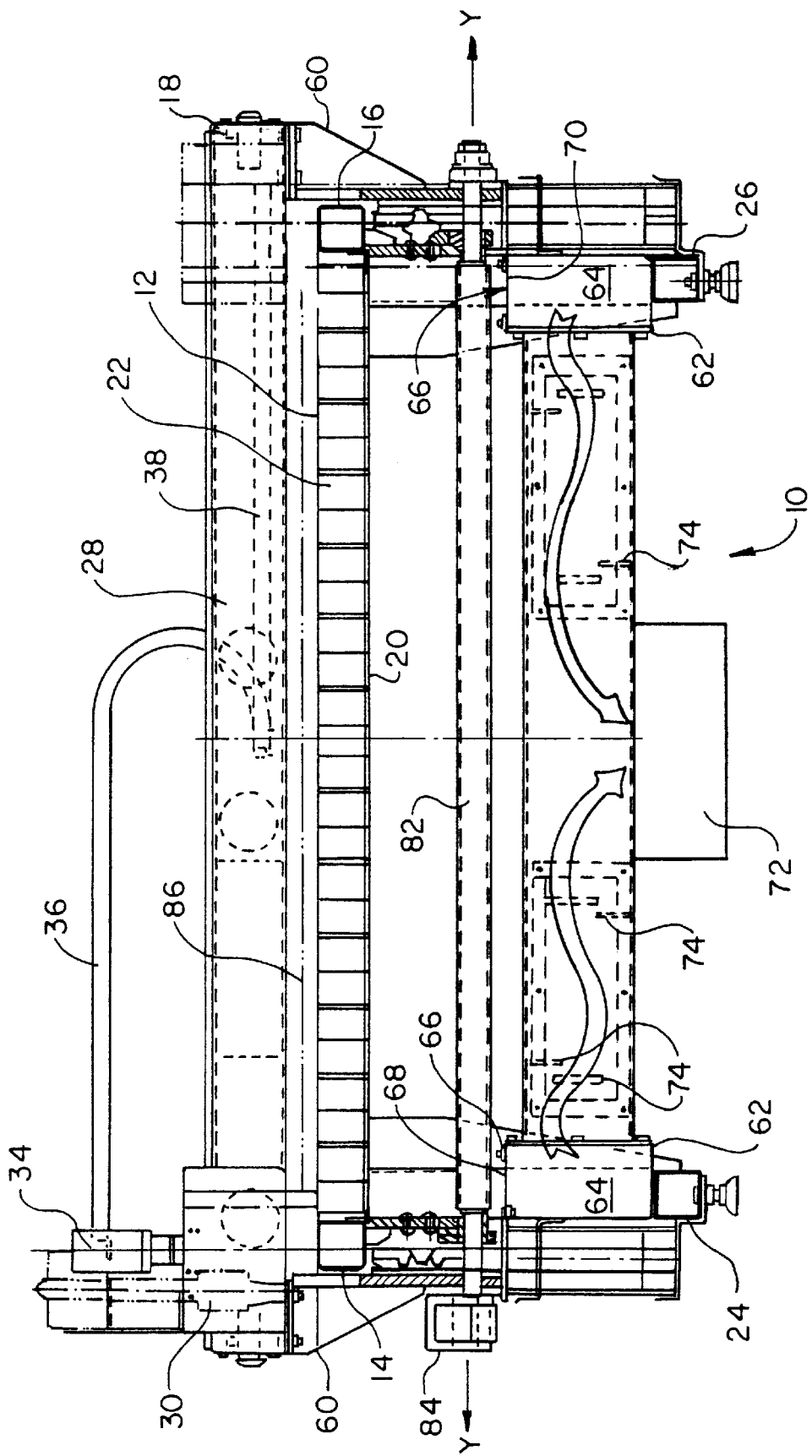
FIG. 1 is a first end view of a plasma cutting table having plenums with flexible material.
Figure 2:
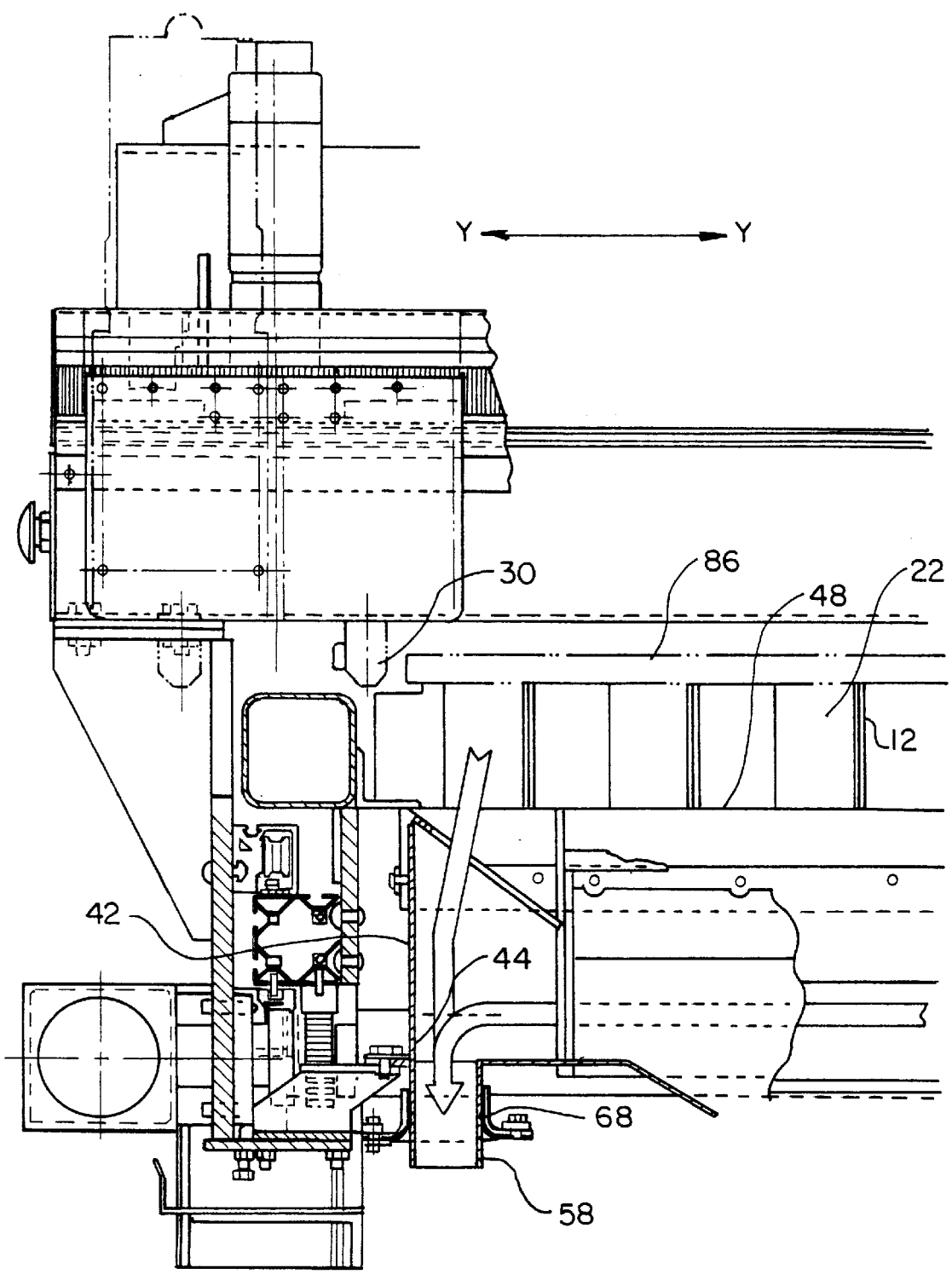
FIG. 2 is a partial sectional end view of the plasma cutting table shown in FIG. 1.

One embodiment of a plasma cutting table 10 according to the present invention is shown in FIGS. 1 and 2. A table 12 has a first end 14, a second end 16, a first surface 18, and a second surface 20. The table 12 is preferably demarcated in standard X-Y grid coordinates and further includes a grid structure that forms a plurality of orifices 22. The orifices 22 allow molten metal or slag to pass through the table 12 during cutting. The table 12 is generally supported by a first table leg 24 positioned perpendicularly adjacent the first end 14 of the table 12 and a second table leg 26 positioned perpendicularly adjacent the second end 16 of the table 12. A bridge 28 is positioned across the table 12, perpendicular to the length of the table 12 and adjacent the first surface 18 of the table 12. The bridge 28 is movable in an X direction (with respect to the table 12). The bridge 28 is movable and has a plasma cutting torch 30 positioned thereon, with the plasma cutting torch 30 movable on the bridge 28 in a Y direction (with respect to the table 12). The plasma cutting torch 30 is positioned adjacent a gas control module 32, and the plasma cutting torch 30 and the gas control module 32 are driven by a motor 34. A flexible bridge cable holder 36, such as sold under the brand name CATRAC, is positioned adjacent a support 38 and a trough 40. The cable holder 36, connects the bridge 28 to the motor 34.

A movable hopper 42 is positioned parallel to the second surface of the table 12, perpendicular to the X table axis. The hopper 42 has a first hopper end 44, a second hopper end 46, and a third hopper end 48 positioned directly opposite the second surface of the table 12 and having a scraper 50 positioned to contact the second surface of the table 12. The hopper 42 forms a tapered internal cavity 52, preferably formed by slot-type openings. At least one conduit 58 is positioned adjacent the first and second hopper ends 44, 46, providing fluid communication between the internal hopper cavity 52 and each conduit 58. The hopper 42 itself is connected to the bridge 28 via bridge connectors 60.

Figure 3:
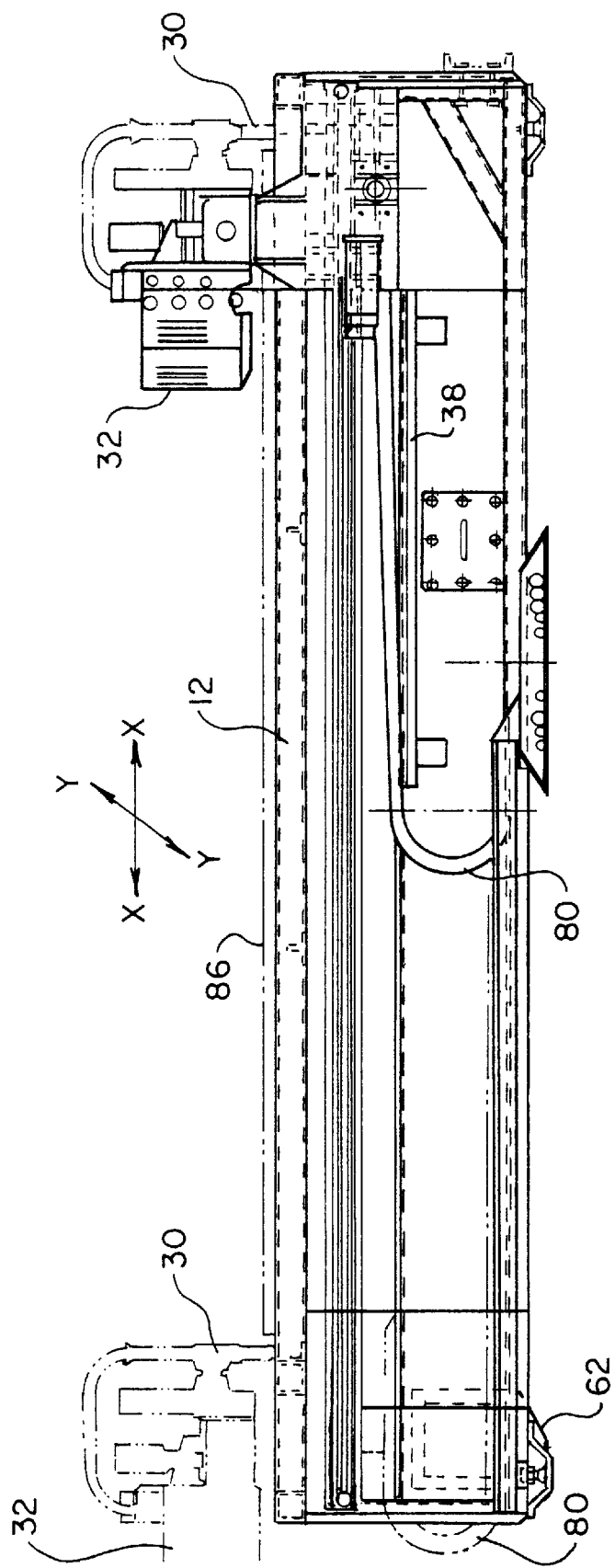
FIG. 3 is a side view of the plasma cutting table shown in FIG. 1.
Figure 4:
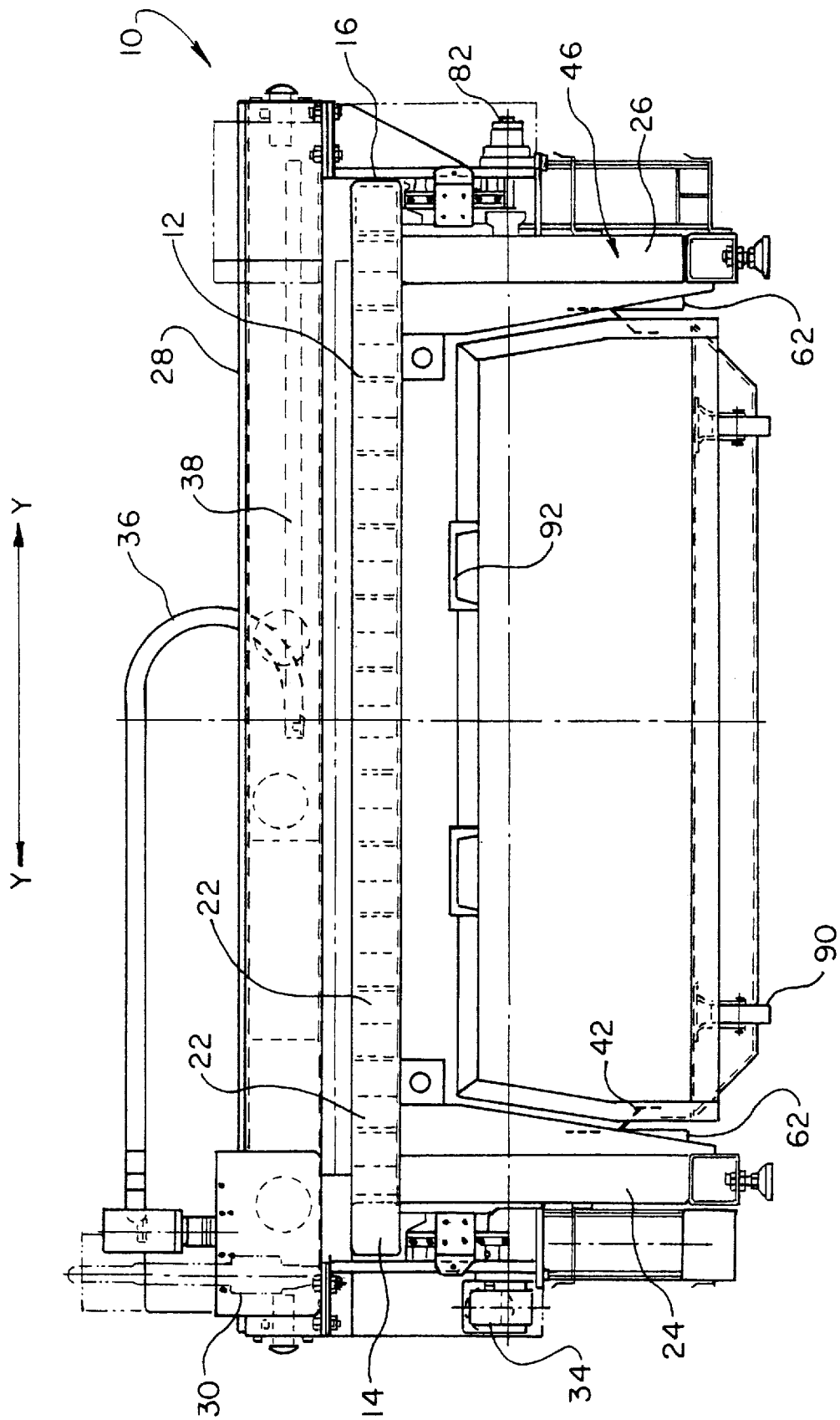
FIG. 4 is a second end view of the plasma cutting table shown in FIG. 1.
Figure 5:
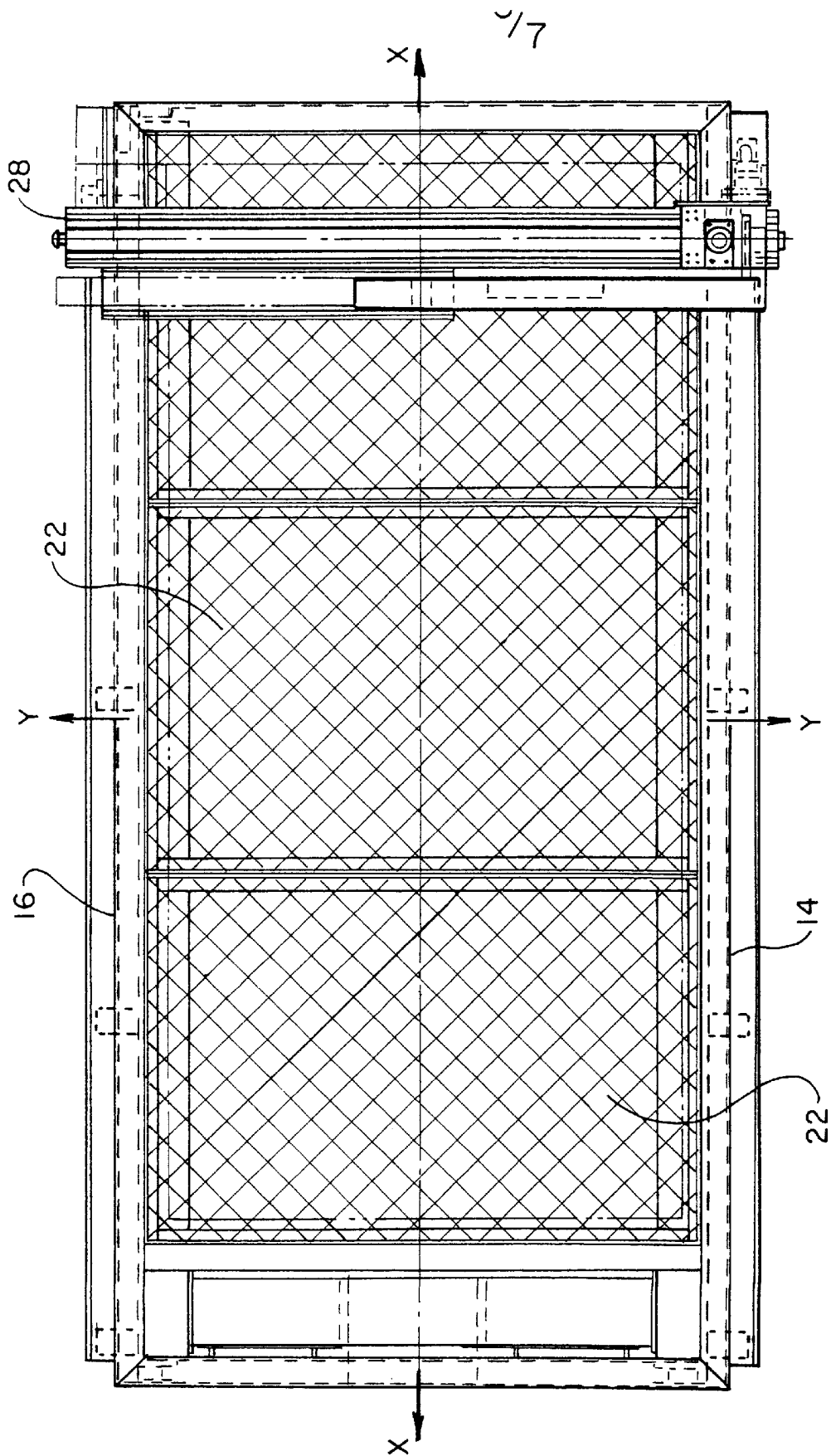
FIG. 5 is a top view of the plasma cutting table shown in FIG. 1.

Positioned adjacent each table leg 24, 26 is a plenum 62. Each plenum 62 forms a channel 64 adjacent a first plenum side 66 for receiving the conduit 58 positioned adjacent the hopper 42. A flexible material 68, having low friction and high heat resistance, is also positioned adjacent each first plenum side 66, with the flexible material 68 preferably made as a reinforced fabric material. A bottom surface 70 of the flexible material 68 is made from a material with a low coefficient of friction and a high heat resistance, such as NOMAX brand cloth. The flexible material 68 forms a movable seal around each hopper conduit 58. The flexible material 68 is formed as a pair of strips of flexible material on opposite side edges of the plenum 62. A vacuum pump 72 is connected to the plenums 62, as shown in FIGS. 1 and 3, with baffles 74 positioned between the plenums 62 and the vacuum pump 72 to emulate a spark box.

Figure 6:
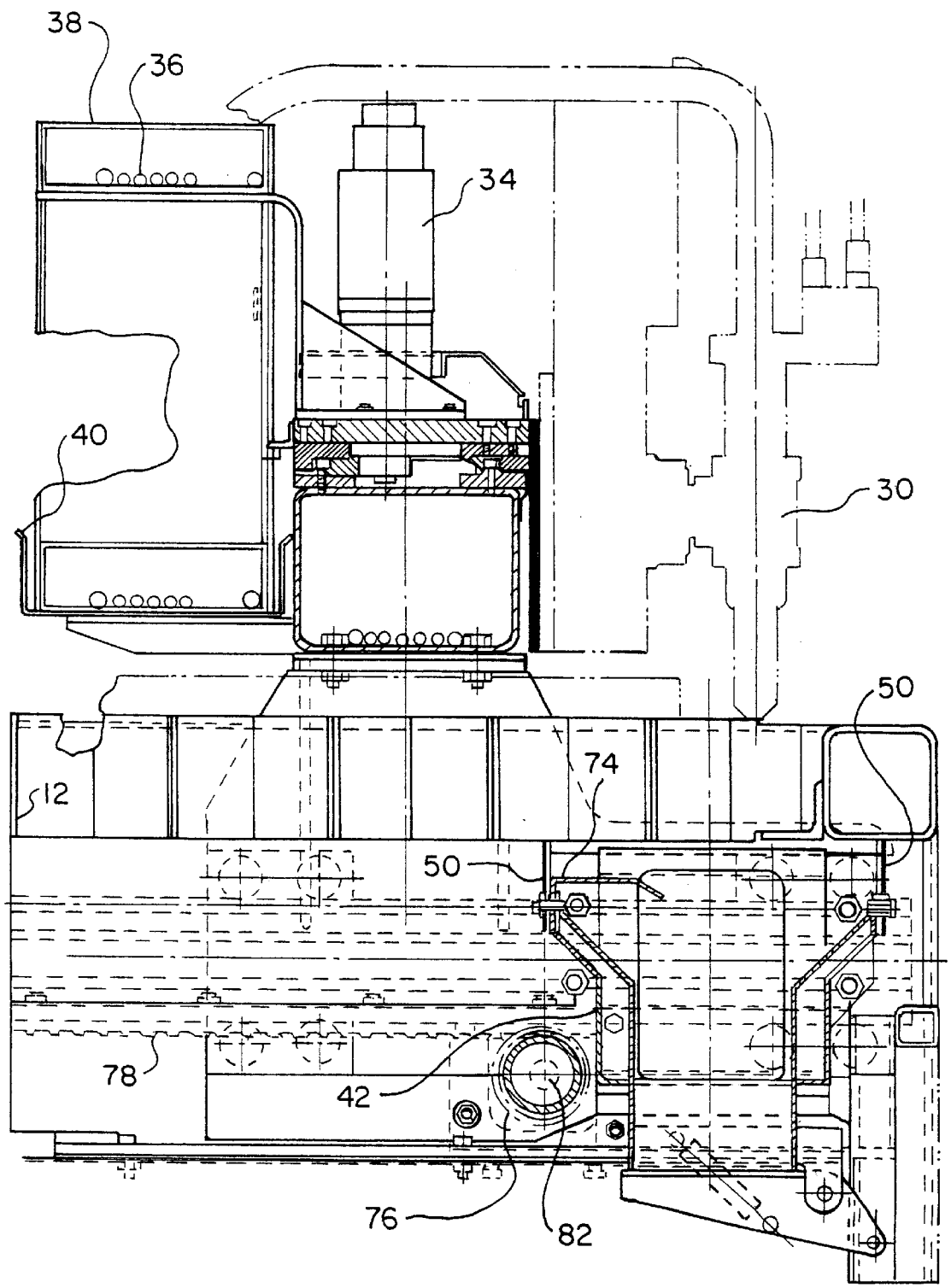
FIG. 6 is a partial sectional side view of the plasma cutting table shown in FIG. 2.
Figure 7:
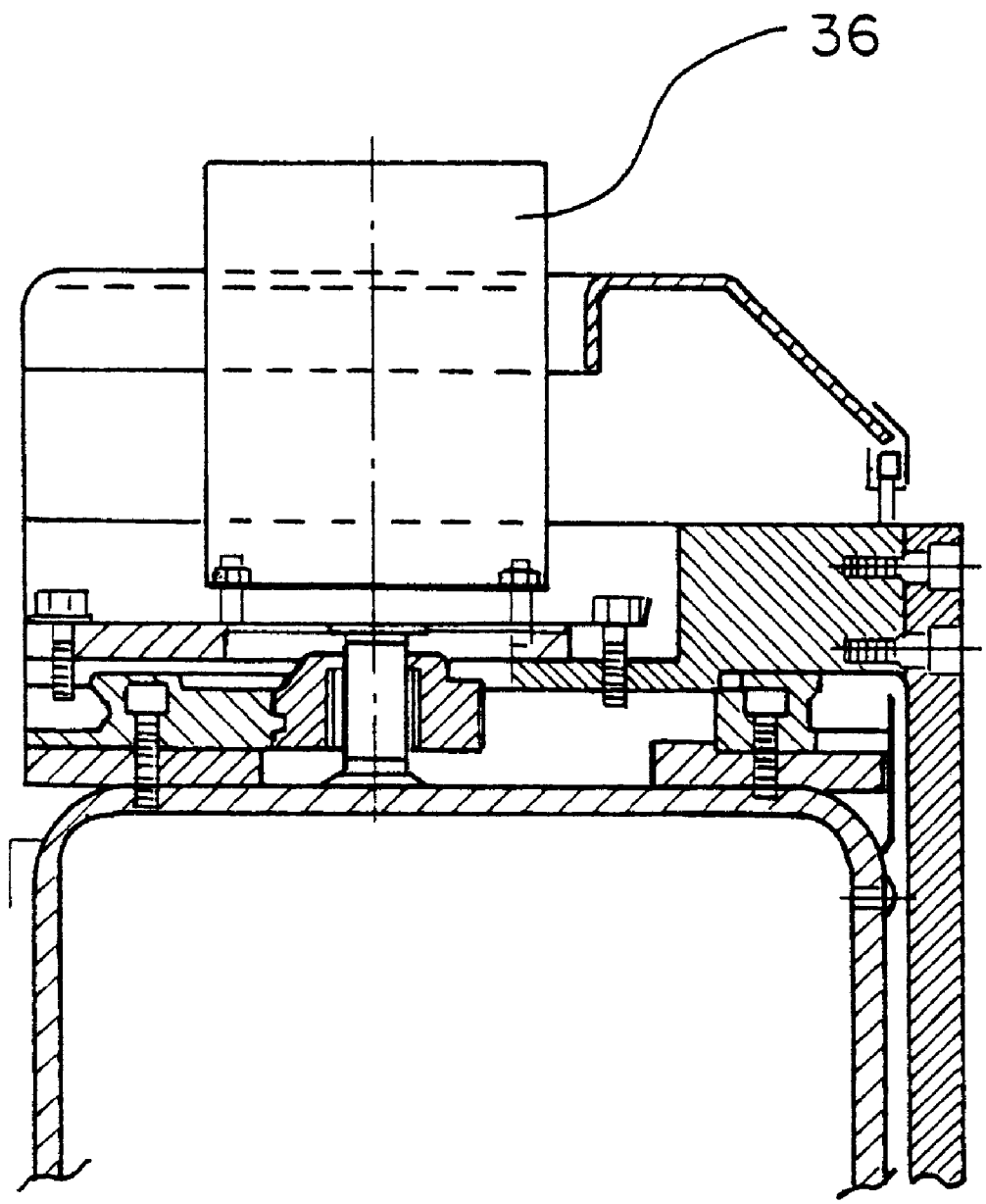
FIG. 7 is a magnified cross-sectional view of the bridge shown in FIG. 6.

The hopper 42 and bridge 28 are driven by a drive assembly. The drive assembly preferably has a gear 76, a gear path 78 extending in an X direction with respect to the table 12, a gear catrac 80, a shaft 82 connecting the first and second table legs 24, 26, and a motor 84. The gear 76 is connected to the shaft 82, with the gear 76 movable within the gear path 78 in an X direction with respect to the table 12, as shown in FIG. 6. The hopper 42 is positioned adjacent the shaft 82, and movement of the gear 76 causes the hopper 42 and bridge 28 to move, in concert, in an X direction with respect to the table 12.

In operation, a workpiece 86 is positioned on the table 12. The bridge 28 and hopper 42 are moved in a general X direction with respect to the table 12 via the drive assembly, until the plasma cutting torch 30 is positioned over an area of the workpiece 86 to be removed. As the hopper 42 moves, each conduit 58 positioned adjacent the hopper 42 movably slides in its respective plenum channel, movably sealed by the flexible material 68. The movable seal between each hopper conduit 58 and each plenum 62 allows a maximum vacuum flow to be maintained between the vacuum pump 72 and the plasma cutting torch 30 during movement of the hopper 42, without the use of bulky hoses. When cutting begins, the slag falls through the orifices 22 in the table 12, through the hopper 42, and then into a flat-bottom slag cart 88 having wheels 90 and handles 92 for easy insulation and removal. Any hot gas or metal drawn past the hopper 42 and into the plenum 62 is retarded by the baffles 74 positioned between the plenums 62 and the vacuum pump 72.

As discussed in the preceding description, the present invention provides a plasma cutting table 10 that evacuates gaseous vapors during cutting operations without the use of bulky vacuum hoses or zone dampers. Evacuation is accomplished via a hopper 42, plenum 62, and vacuum pump 72, wherein the hopper 42 and plenum 62 are movably sealed by a flexible material 68 and provide a continuous vacuum between the vacuum pump 72 and a cutting region adjacent the plasma cutting torch 30.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claim or the equivalent thereof.

What is claimed is:

1. A plasma cutting table comprising:
   a table;
   a movable bridge extending across the table;
   a plenum positioned adjacent the table, the plenum forming a channel;
   a hopper adjacent the table and attached to the bridge to be movable relative to the table;
   a conduit extending from the hopper to the channel, wherein the conduit is slidably positioned in the channel formed by the plenum; and
   a flexible sealing member attached to the plenum forming a seal between the conduit and the plenum.

2. A plasma cutting table as defined in claim 1 wherein the flexible sealing member includes at least one strip of flexible material extending the length of the plenum.

3. A plasma cutting table as defined in claim 1 wherein the flexible sealing member includes a pair of strips of flexible material extending the length of the plenum on opposed sides of the plenum, wherein the conduit is received between the pair of strips of flexible material.

4. A plasma cutting table as defined in claim 3 wherein each strip of flexible material extending the length of the plenum is a reinforced fabric material.

5. A plasma cutting table as defined in claim 1 further including a vacuum pump connected to the plenum through a chamber including a plurality of baffles.

6. A plasma cutting table as defined in claim 1 further including a plasma cutter carried on the bridge.

7. A plasma cutting table as defined in claim 1 further including a second plenum positioned adjacent the table, the plenum forming a channel, a second conduit extending from the hopper to the channel of the second plenum, wherein the second conduit is slidably positioned in the channel formed by the second plenum, and a second flexible sealing member attached to the second plenum forming a seal between the second conduit and the second plenum.

8. A plasma cutting table as defined in claim 7 further including a motor for moving the bridge and hopper along the table.

9. A plasma cutting table as defined in claim 7 wherein the plenums are positioned on opposite sides of the table.

10. A plasma cutting table as defined in claim 7 wherein the hopper is positioned below the table.

11. A gas evacuation system as defined in claim 1 wherein the flexible sealing member includes a pair of strips of flexible material extending the length of the plenum on opposed sides of the plenum, wherein the conduit is received between the pair of strips of flexible material.

12. A gas evacuation system as defined in claim 3 wherein each strip of flexible material extending the length of the plenum is a reinforced fabric material.

13. A gas evacuation system as defined in claim 1 further including a vacuum pump connected to the plenum through a chamber including a plurality of baffles.

14. A gas evacuation system as defined in claim 1 further including an attachment between the hopper and a bridge of the plasma table.

15. A gas evacuation system as defined in claim 1 further including a second plenum positioned adjacent the table, the plenum forming a channel, a second conduit extending from the hopper to the channel of the second plenum, wherein the second conduit is slidably positioned in the channel formed by the second plenum, and a second flexible sealing member attached to the second plenum forming a seal between the second conduit and the second plenum.

16. A gas evacuation system for a plasma cutting table comprising:
 a stationary plenum positioned adjacent the table, the plenum forming a channel;
 a movable hopper adjacent the table to be movable relative to the table;
 a conduit extending from the hopper to the channel, wherein the conduit is slidably positioned in the channel formed by the plenum; and
 a flexible sealing member attached to the plenum forming a seal between the conduit and the plenum.

17. A gas evacuation system as defined in claim 16 wherein the flexible sealing member includes at least one strip of flexible material extending the length of the plenum.

18. A gas evacuation system as defined in claim 16 further including a motor for moving the hopper along the table.

19. A plasma cutting table as defined in claim 15 wherein the plenums are positioned on opposite sides of the table.

20. A plasma cutting table comprising:
 an open frame table;
 a movable bridge extending across the table;
 a pair of opposed plenums positioned adjacent the table on opposite sides of the table extending along the general length of the table, each plenum forming a channel;
 a hopper extending across an underside of the table and attached to the bridge to be movable relative to the table with the bridge;
 a pair of conduits extending from the hopper to each channel, respectively, wherein each conduit is slidably positioned in the channel formed by the respective plenum;
 a flexible sealing member attached to an upper side of each plenum forming a seal between the conduit and the plenum, wherein the flexible sealing member includes a pair of strips of flexible material extending the length of the plenum on opposed sides of the plenum, wherein the conduit is received between the pair of strips of flexible material; and
 a vacuum pump connected to the pair of plenums through a pair of chambers each including a plurality of baffles, wherein the hopper, conduits, plenums, baffled chambers and vacuum pump form a gas evacuation system for the plasma cutting table.

* * * * *